(12) United States Patent
Shaw et al.

(10) Patent No.: US 7,873,214 B2
(45) Date of Patent: Jan. 18, 2011

(54) UNSUPERVISED COLOR IMAGE SEGMENTATION BY DYNAMIC COLOR GRADIENT THRESHOLDING

(75) Inventors: Mark Shaw, Meridian, ID (US); Ranjit Bhaskar, Portland, OR (US); Guru Prashanth Balasubramanian, Milpitas, CA (US); Eli Saber, Rochester, NY (US); Vladimir Misic, Rochester, NY (US); Eric Robert Peskin, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 11/742,306

(22) Filed: Apr. 30, 2007

(65) Prior Publication Data

US 2008/0267498 A1   Oct. 30, 2008

(51) Int. Cl.
*G06K 9/34* (2006.01)
(52) U.S. Cl. ..................................... 382/173
(58) Field of Classification Search .................. 382/173
See application file for complete search history.

(56) References Cited

U.S. PATENT DOCUMENTS

| 5,917,928 | A | 6/1999 | Shpuntov et al. | |
|---|---|---|---|---|
| 6,947,605 | B2 | 9/2005 | Prakash et al. | |
| 7,031,517 | B1* | 4/2006 | Le et al. | 382/173 |
| 7,110,602 | B2 | 9/2006 | Krause | |
| 7,133,564 | B2 | 11/2006 | Ratner et al. | |
| 2005/0013486 | A1 | 1/2005 | Wiedemann et al. | |
| 2006/0098870 | A1* | 5/2006 | Tek et al. | 382/173 |
| 2008/0008369 | A1* | 1/2008 | Koptenko et al. | 382/128 |

FOREIGN PATENT DOCUMENTS

| GB | 2385187 A | 8/2003 |
|---|---|---|
| WO | WO-02069262 | 9/2002 |
| WO | WO-2006/114003 A1 | 11/2006 |

OTHER PUBLICATIONS

Cramariuc, B.—"Clustering based region growing algorithm for color image segmentation"—DSP 1997, pp. 857-860.*
Deng, Y.—"Unsupervised segmentation of color-texture regions in images and video"—IEEE 2001, pp. 800-810.*
Shih, F.—"Automatic seeded region growing for color image segmentation"—Image and Vision Computing 23 (2005), pp. 877-886.*
Otsu, N.—"A threshold selection method from gray-level histograms"—IEEE 1979, pp. 62-66.*
Kutics, A and Nakagawa, A., "Detecting Prominent Objects for Image Retrieval", International Conference on Image Processing, Genova, Italy, Sep. 2005, pp. III-445-448.

(Continued)

*Primary Examiner*—Bhavesh M Mehta
*Assistant Examiner*—Bernard Krasnic

(57) ABSTRACT

A method for segmenting an image includes computing a color gradient map based on an inputted image and selecting at least one initial seed of at least one pixel based on the color gradient map. The method further includes growing a region of pixels adjacent to the initial seed and merging adjacent regions of pixels using a measure of similarity.

19 Claims, 4 Drawing Sheets

OTHER PUBLICATIONS

Preteux, F.; Curila, S, and Malciu, M., "3D Object Registration in Image Sequences", Proceedings of the SPIE—The International Society for Optical Engineering, vol. 3304, San Jose, CA, USA, Jan. 1998, pp. 186-196.

L. Lucchese and S. K. Mitra, "Color Image Segmentation: A State-of-the-Art Survey," in Proc. Indian Nat. Sci. Acad. (INSA-A), vol. 67-A, New Delhi, India, Mar. 2001, pp. 207-221.

L. Shafarenko, M.; Petrou, and J. Kittler, "Histogram-Based Segmentation in a Perceptually Uniform Color Space," IEEE Trans. Image Process., vol. 7, No. 9. pp. 1354-1358, Sep. 1998.

M. Mirmehdi and M. Petrou, "Segmentation of color textures," IEEE Trans. Pattern Anal. Mach. Intell., vol. 22, No. 2, pp. 142-159, Feb. 2000.

Makrogiannis et al., "Segmentation of Color Images Using Multiscale Clustering and Graph Theoretic Region Synthesis," IEEE Trans. on SMC, vol. 35, No. 2, Mar. 2005.

E. Saber, A. M. Tekalp, and G. Bozdagi, "Fusion of color and edge information for improved segmentation and edge linking," Image Vis. Comp., vol. 15, No. 10, Oct. 1997.

Xiuwen Liu, DeLiang Wang, "Image and Texture Segmentation Using Local Spectral Histograms", IEEE Trans. Image Process., vol. 15, No. 10, Oct. 2006.

H. Cheng and Y. Sun, "A hierarchical approach to color image segmentation using homogeneity," IEEE Trans. Image Process., vol. 9, pp. 2071-2082, Dec. 2000.

O. Lezoray and H. Cardot, "Histogram and watershed based segmentation of color images," Proceedings of CGIV'2002, pp. 358-362, 2002.

I. Vanhamel, I. Pratikakis, H. Sahli, "Multiscale gradient watersheds of color images," IEEE Trans. on Image Processing, vol. 12, No. 6, Jun. 2003.

L. Shafarenko, M. Petrou, and J. Kittler, "Automatic watershed segmentation of randomly textured color images," IEEE Trans. on Image Processing, vol. 6, No. 11, pp. 1530-1544, 1997.

\* cited by examiner

UNSUPERVISED COLOR IMAGE SEGMENTATION BY DYNAMIC COLOR GRADIENT THRESHOLDING

BACKGROUND

Image segmentation is an image processing technique used in a wide variety of industries including medical image analysis, satellite imagery, visual surveillance and face recognition systems. Image segmentation partitions a digital image into multiple regions (i.e., sets of pixels) based on some homogeneity metric such as color, texture or contrast. This low-level abstraction provides high-level semantic operations with a reduced and relevant data set.

There are a number of existing techniques used for color image segmentation including feature-based, edge-based, region-based and hybrid segmentation approaches. Among the feature-based approaches, clustering techniques are the most popular. Clustering aims at grouping unlabeled image pixels into well-separated homogenous clusters to achieve a reduction in data. This grouping is performed in the image feature space utilizing some characteristic feature. While this method is efficient in segregating data based on global features, it ignores the spatial relationship of the image pixels. As a result, regions though spatially disconnected, end up having the same label. In addition, clustering requires the determination of cluster centroids and their number, which necessitates human supervision.

Use of histograms for segmentation is another feature-based technique wherein multilevel thresholding approaches are applied globally to the probability distribution function to separate regions of varying intensity or hue. This technique is sensitive to noise and requires the number of classes to be provided for segmentation.

Edge-based techniques utilize a threshold to determine binary pixel edges on a gradient or Laplacian map. In this way, an image is separated into regions based on changes in pixel intensity. In general, the generation of reliable edges is governed by the binarization threshold, which varies widely over different images. Consequently, the choice of a poor threshold results in disconnected edges or noisy pixels leading to regions with open contours. Post-processing techniques to fill gaps in disconnected edges is time-consuming while rendering them is undesirable.

Segmentation methods using region characteristics utilize spatial information along with intensity, texture or color information and ensure the formation of regions with closed boundaries. Seeded region growing uses a set of pixels as starting seeds, which are grown iteratively by grouping similar adjacent pixels to produce spatially coherent regions. The selection of seeds, however, influences the efficiency of segmentation and generally requires supervision.

Split-and-merge techniques start by recursively splitting non-homogeneous regions until they results in homogenous regions. After the splitting stage, the split regions are merged using some similarity measure. The resulting segmentation, however, has imprecise boundaries due to blockiness.

Accordingly, the embodiments described hereinafter were developed in light of these and other drawbacks associated with known image segmentation techniques.

DETAILED DESCRIPTION

A hybrid image segmentation approach that employs vector-based color gradient and an automatic thresholding operator to perform a dynamic threshold-based segmentation is provided. This approach employs a weighted vector-based color gradient map that provides the groundwork upon which seeds are generated and region growing is automated. Seeds refer to a four-neighborhood connected set of pixels whose gradient is below a specified threshold. The dynamic threshold operator applied to this gradient map governs the growth process. Additional seeds, if any, are introduced dynamically to add robustness to the growing stage. To ensure consistency of the segmentation with the image regions, region growing is followed by a similarity measure-based region-merging stage to produce an optimally segmented image.

Figure 1:
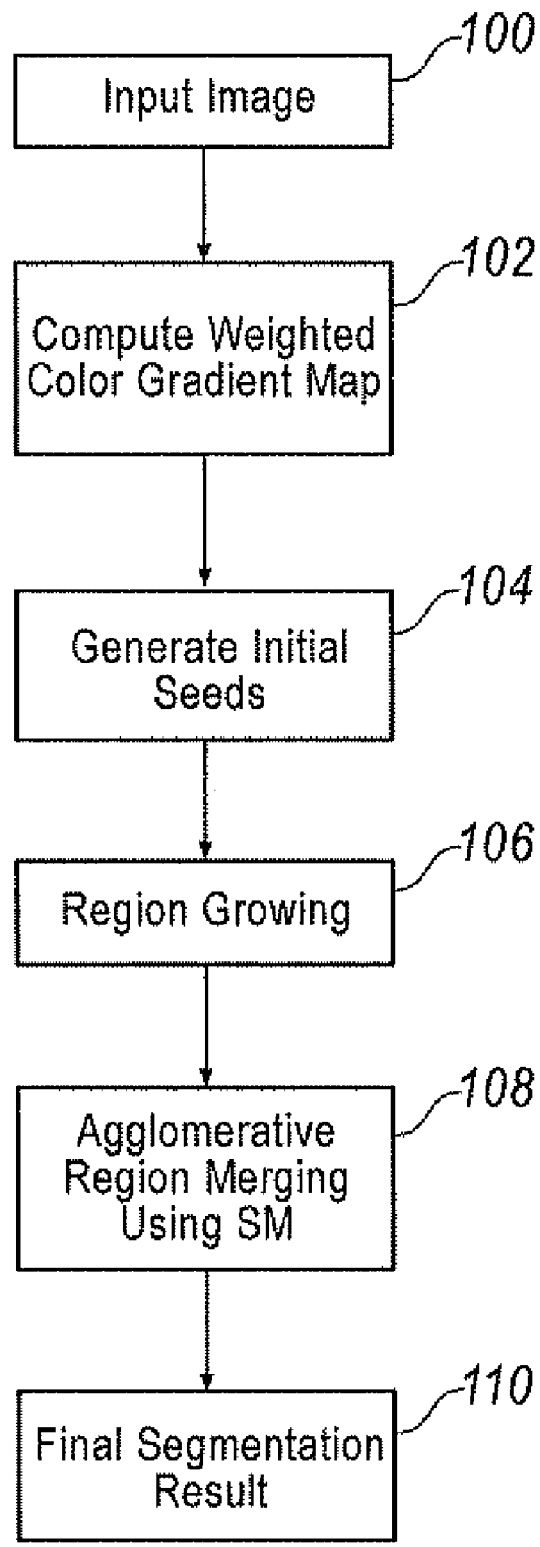
FIG. 1 illustrates an exemplary image segmentation process, according to an embodiment.

FIG. 1 is a flow chart illustrating an exemplary image segmentation process. At step 100, an image is inputted into an image processing system, which in this case, can be any computer or processor capable of performing the image processing algorithms disclosed herein. In one embodiment, the algorithms disclosed herein are run in a MATLAB® environment, however, other suitable simulation methods or approaches may also be used. At step 102, a descriptor is devised to classify the color image into color homogenous regions and regions of color transitions. This is achieved by utilizing a color gradient map for the inputted image. Depending on the manner in which individual color channels are processed, gradient computation methods for color images are categorized into scalar and vector techniques. Scalar techniques work on each color channel independently before fusing them to generate the resultant gradient. Vector methods on the other hand, process the different color channels holistically in all dimensions in a principled manner to compute the gradient and are hence much more effective. Although both methods are viable alternatives, the primary embodiment discussed herein uses the vector-based color gradient approach, which is more robust to noise than the scalar-based color gradient.

In one embodiment, the color gradient map is developed with a vector color gradient matrix, D, which is defined as:

$$D = \begin{bmatrix} du/dx & du/dy \\ dv/dx & dv/dy \\ dw/dx & dw/dy \end{bmatrix} \quad (1)$$

Where u, v and w denote three color channels of a color image C, and x and y denote the spatial coordinates of each pixel of C. The product matrix $D^T D$ is then written as:

$$D^T D = \begin{bmatrix} p & t \\ t & q \end{bmatrix} \quad (2)$$

Where $D^T$ is D transposed and $$p = \left(\frac{du}{dx}\right)^2 + \left(\frac{dv}{dx}\right)^2 + \left(\frac{dw}{dx}\right)^2 \quad (3)$$

-continued $$q = \left(\frac{du}{dy}\right)^2 + \left(\frac{dv}{dy}\right)^2 + \left(\frac{dw}{dy}\right)^2 \qquad (4)$$

$$t = \left(\frac{du}{dx}\right)\left(\frac{du}{dy}\right) + \left(\frac{dv}{dx}\right)\left(\frac{dv}{dy}\right) + \left(\frac{dw}{dx}\right)\left(\frac{dw}{dy}\right) \qquad (5)$$

The largest eigenvalue, $\lambda$ of $D^T D$ is then calculated as:

$$\lambda = \tfrac{1}{2}(p+q+\sqrt{(p+q)^2 - 4(pq-t^2)}) \qquad (6)$$

Finally, the magnitude of the vector-based color gradient is defined as the square root of the largest eigenvalue:

$$G = \sqrt{\lambda} \qquad (7)$$

The color gradient map G is a matrix of gradient magnitudes at each pixel location. It forms the foundation for the seed generation process and subsequent region growing.

Figure 2:
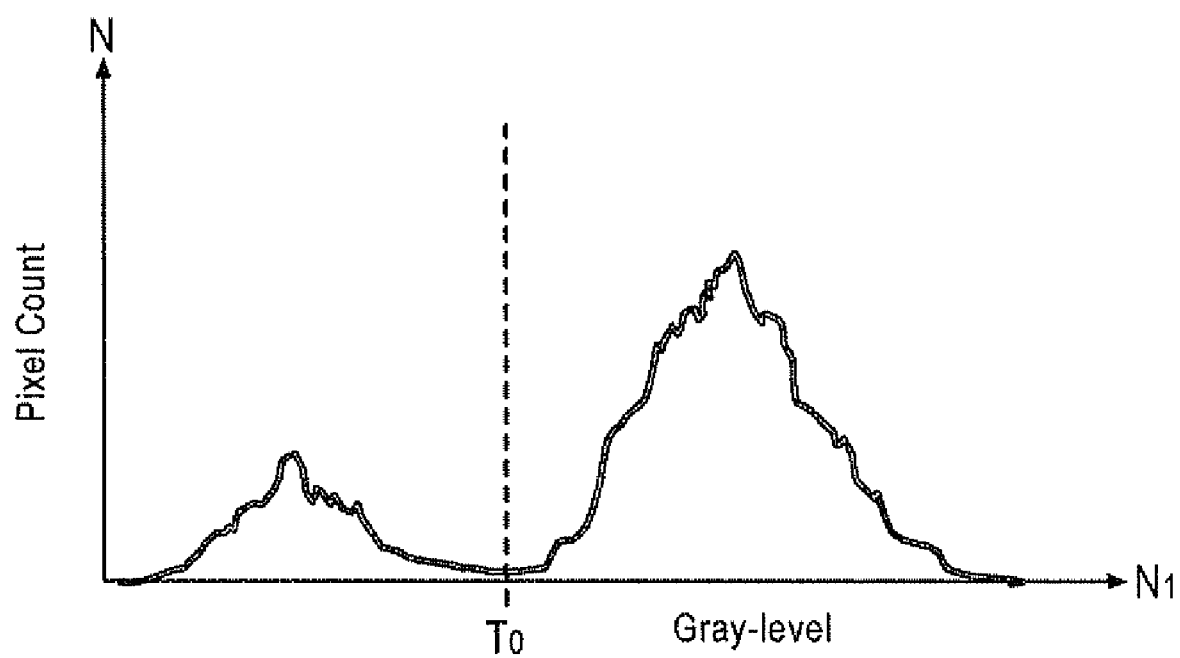
FIG. 2 illustrates a graph depicting the level of gray scale in a particular image, according to an embodiment.

The vector-based color gradient map G is a grayscale image with L distinct gradient values. The higher gradient values correspond to regions of color edges and the lower gradient values correspond to homogenously colored regions. As shown in FIG. 2, an optimum threshold, $T_o$, is automatically computed for separating the edge pixels from the pixels in homogenous regions were n is the total number of pixels in the given image and $n_i$ be the number of pixels in the image with gray-level i, then the probability of occurrence of gray-level i is defined as:

$$p_i = n_i/n \qquad (8)$$

The average gray-level of the entire image is then;

$$\mu_T = \sum_i^{L-1} i p_i \qquad (9)$$

where $\mu_T$ is the global mean. If $C_1 = \{0, \ldots, f\}$ and $C_2 = \{t+1, \ldots, L-1\}$, are two classes corresponding to the pixels of interest and the background respectively, and t being the threshold value, then their respective probabilities are:

$$\omega_1(t) = \sum_{i=0}^{t} p_i \qquad (10)$$

$$\omega_2(t) = \sum_{i=t+1}^{L-1} p_i$$

And their means are defined as:

$$\mu_1(t) = \sum_{i=0}^{t} i p_i / \omega_1(t); \qquad (11)$$

$$\mu_2(t) = \sum_{i=t+1}^{L-1} i p_i / \omega_2(t)$$

The between-class variance is given by:

$$\sigma_B^2(t) = \omega_1(t)(\mu_1(t) - \mu_T)^2 + \omega_2(t)(\mu_2(t) - \mu_T)^2 \qquad (12)$$

The automatic optimal threshold, $T_o$ is then calculated by maximization of the between-class variance using discriminant analysis as in equation 13.

$$T_o = \underset{0 \leq t < L}{\mathrm{ArgMax}} \{\sigma_B^2(t)\} \qquad (13)$$

This is used to calculate the dynamic thresholds for the gradient map, as described below.

The color gradient map G described above serves as a potent descriptor of homogenous regions and region transitions and is utilized as the framework for growing seeds. The use of the gradient map G for the growing process instead of the intensity or color plane(s) directly, achieves two important objectives. Firstly, since most of the gradient energy is concentrated at edges than in region interiors, pixels in these regions are classified rapidly. Secondly, since pixels at the edges are classified towards the final stages of growth, region boundaries are detected with greater accuracy.

The color gradient map has to be intelligently processed to amplify the strong and weak edges while attenuating low gradient regions. Therefore, in one embodiment, the global gray-level contrast of the gradient map is adjusted using intensity clipping and stretching operations documented below. Since the images under consideration are generally natural images, color variations are usually gradual in comparison with those encountered with graphic images. This necessitates the need of a scaling operation that non-linearly increases the contrast between the low and high color gradients. First, pixels with gradient values between 10% and 90% of maximum gradient value are mapped to the range 0 to 1 (i.e., the stretching operation). Then pixels below 10% and above 90% of maximum gradient value are assigned 0 and 1 respectively (i.e., the clipping operation). The result of these operations is an enhanced gradient map $G_E$. This is followed by a masking operation that employs an Edge Field. The purpose is to weight the gradient map, as documented below in Equation 14. The Edge Field Map, L is a local gradient-based binarized image generated using two-threshold levels. If $T_H$ and $T_L$ are the high and low level thresholds respectively, we have, $$L(i, j) = 1, \text{ if } G_E(i, j) > T_H;$$
$$= 1, \text{ if } G_E(i, j) > T_L \text{ and is connected to at least}$$
$$\text{one point that has a gradient amplitude}$$
$$\text{greater that } T_H;$$
$$= 0, \text{ othewrwise.}$$

The Edge Field Map, L thus essentially retains strong edges along with weak edges that are adjacent to strong edges while minimizing noisy pixels that are not part of the edge. The Threshold Map $T_G$ is generated by binarizing $G_E$ using 25% of the optimal threshold, $T_o$. Since the optimal threshold is generated using the global image statistics, a $25^{th}$ percentile of this value ensures that the binarization process produces connected edges. Thus, $T_G$ effectively results in a binarized representation of the strong edge locations. A weighted color gradient map, $G_W$ is then defined as the enhanced gradient $G_E$, multiplied with the resultant of the "or" (union) operation of images L and $T_G$, where:

$$G_W = G_E * (L \cup T_G) \qquad (14)$$

At step 104, initial seeds are generated based on the weighted color gradient map, $G_W$. In some case, the choice of seeds decides the quality of the final segmentation. Therefore, seeds are generated within all potential segments to avoid under segmentation issues. To this end, low gradient regions in the weighted color gradient map $G_W$ form reliable seed candidates and are chosen for driving region growth. For the seed generation process, the global optimal threshold, $T_o$ is computed using the method described above. To account for the lowest gradients, initial seed labels are assigned to four-neighborhood connected pixels with intensities<0.1 $T_o$. To ensure reliability, only those seed groups that satisfy minimum seed size criterion (i.e., with considerable pixel count) are retained and passed as input seeds for the region growing stage.

At step 106, an automatic dynamic thresholding scheme using an initial optimal threshold $T_o^1$ is implemented to provide an unsupervised method to generate reliable pixels for region growing. This serves as the initial threshold for seed generation. Having generated the seeds at step 104, the unsegmented gradient map pixels then serve as input data for the next level of thresholding resulting in a new threshold, $T_o^2$. The difference between the initial threshold, $T_o^1$ and the current threshold $T_o^2$ is the basis of their generation. The initial threshold was computed on the entire pixel set. In contrast, the new threshold is computed only on the set of pixels that remain unclassified (i.e., pixels that are not yet part of a segmented region). This is the Dynamic Color Gradient Threshold, $T_D$ ($T_D \in \{T_o^1, T_o^2, T_o^3 \ldots T_o^n\}$). Consequently, the dynamic threshold increases with each iteration of region growing. This increase ensures that each iteration of region growing proceeds from the core areas (which depict homogenous regions devoid of edges) and moves outwards towards the edges. Each dynamic update of the threshold adds more core pixels to the set of growing region pixels while the edge pixels are identified and excluded for final stages of growth. This behavior ensures that strong edges are never submerged. It is also notable that segmentation can now be achieved without the need to determine binary edges. The approach thus overcomes issues posed by disconnected edges and noise.

While the dynamic threshold serves as the upper limit for each threshold update, region growing is brought about in a slower, surer way by incorporating an additional parameter called the Growth Factor, $f_G$. The growth factor, $f_G$ grows in steps of s (i.e., $f_G \in \{f_{Gi}, f_{Gi}+s, \ldots, 1\}$; $\{f_{Gi}, s\} = \{0, \ldots, 1\}$) and controls the density of pixels being merged. A smaller value of s and hence $f_G$, results in slow but precise growth of regions and vice versa. Thus, the upper bound for foreground pixel classification, U in each iteration of region growth is given by $$U = f_G * T_D \tag{15}$$

Figure 3:
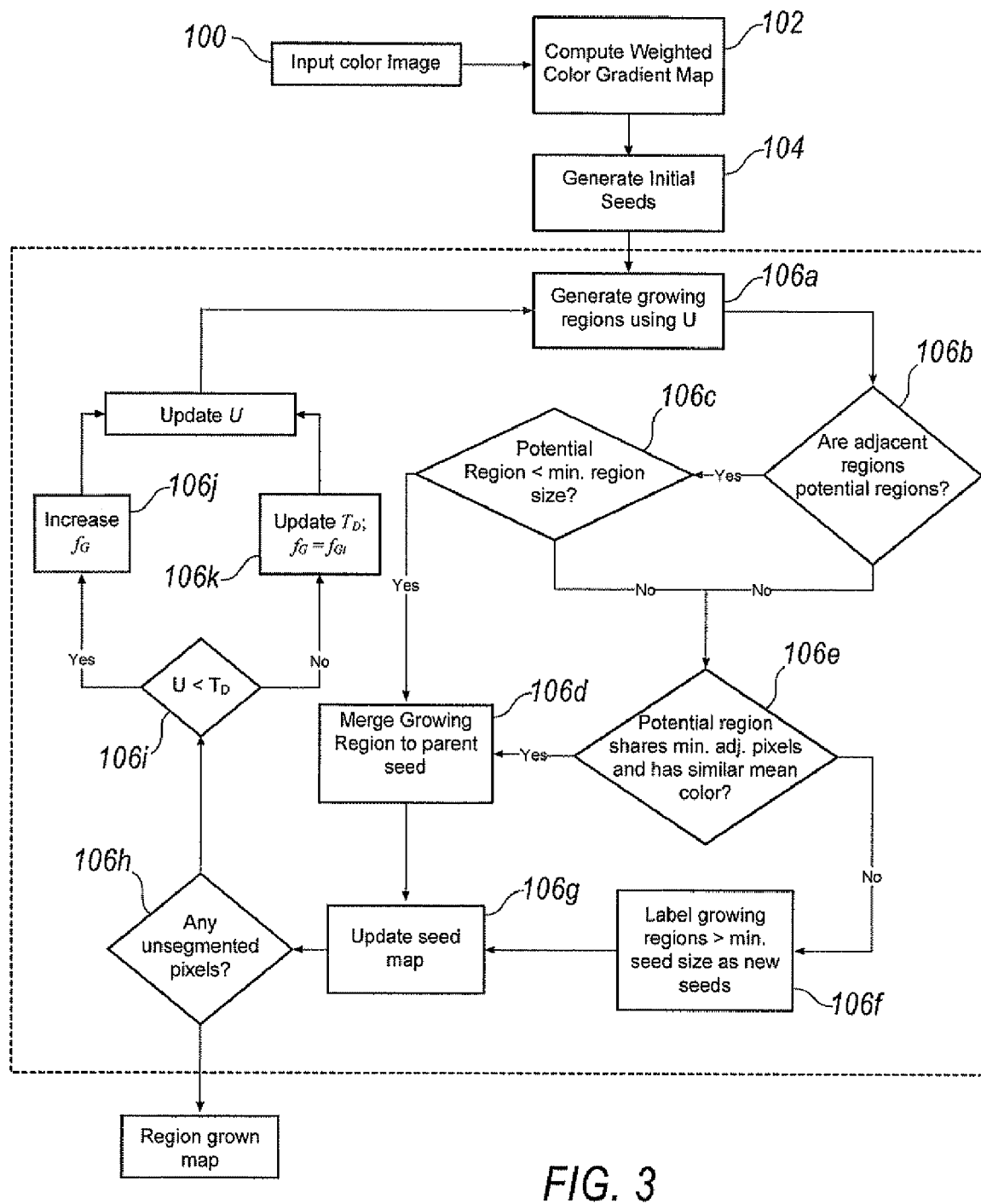
FIG. 3 illustrates an exemplary growing stage process, according to an embodiment.

FIG. 3 illustrates an exemplary growing stage process according to the above-described thresholding scheme (i.e., step 106). After the seed generation stage at step 106a, a seed group of four-neighborhood connected pixels below the upper bound U, and not part of the seed group, is assigned. At step 106b, growing regions adjacent to the growing regions are identified as potential regions. For each region, the seed sharing maximum neighboring pixels are labeled as the region's parent seed. This ensures a high degree of similarity between the parent seed and the potential region. At step 106c, each potential region is compared to a minimum region size. If the size of the potential region is less than the minimum region size, then it is merged at step 106d directly with the parent seed. If size of potential region is greater than the minimum region size, then the potential seed is merged at step 106e only if it shares a minimum number of adjacent pixels with the parent seed and is similar in mean color. This dual merging condition ensures that large potential regions merge to the seed restrictively while miniscule potential regions merge easily. This leads to negligible errors, if any, in seed growth. If the potential region does not meet the criteria of having the minimum number of adjacent pixels and is not a similar mean color, then at step 106f, new seed status is assigned to growing regions that do not have any parent seed or have failed the merging criterion but satisfy the minimum seed size criterion (e.g., unsegmented pixels). This adds dynamic seed generation capability to the region growing process and addresses any possible errors in the initial seed generation stage. This ensures that regions that have not been assigned seeds in the seed generation stage are not merged with their neighbors.

The seed map is updated at step 106g. At step 106h, the gradient map is analyzed to determine if there are any unsegmented pixels. If unsegmented pixels are identified, the upper bound for pixel classification U is compared to the dynamic color gradient threshold, $T_D$ at step 106i. If $U<T_D$, U is updated at step 106j by increasing $f_G$. This cycle achieves region growing between two limits, the old $T_D$ ($T_o^{x-1}$) and new $T_D(T_o^x)$, where x ranges from 1 to n, refer to the definition of $T_D$ in section 0019. Compute the new $T_D$ when U exceeds old $T_D$ at step 106k. Simultaneously, set $f_G$ to its initial value and update U. When new $T_D \approx$ old $T_D$, it indicates threshold saturation has been reached implying that only the edge pixels remain to be segmented. For further classification of the remaining pixels which have gray level values greater than the saturation threshold, assign $T_D$ to the maximum gradient value of the unsegmented pixels. Update U and perform classification of edge pixels starting from step 4 to complete the region growing process.

Figure 4:
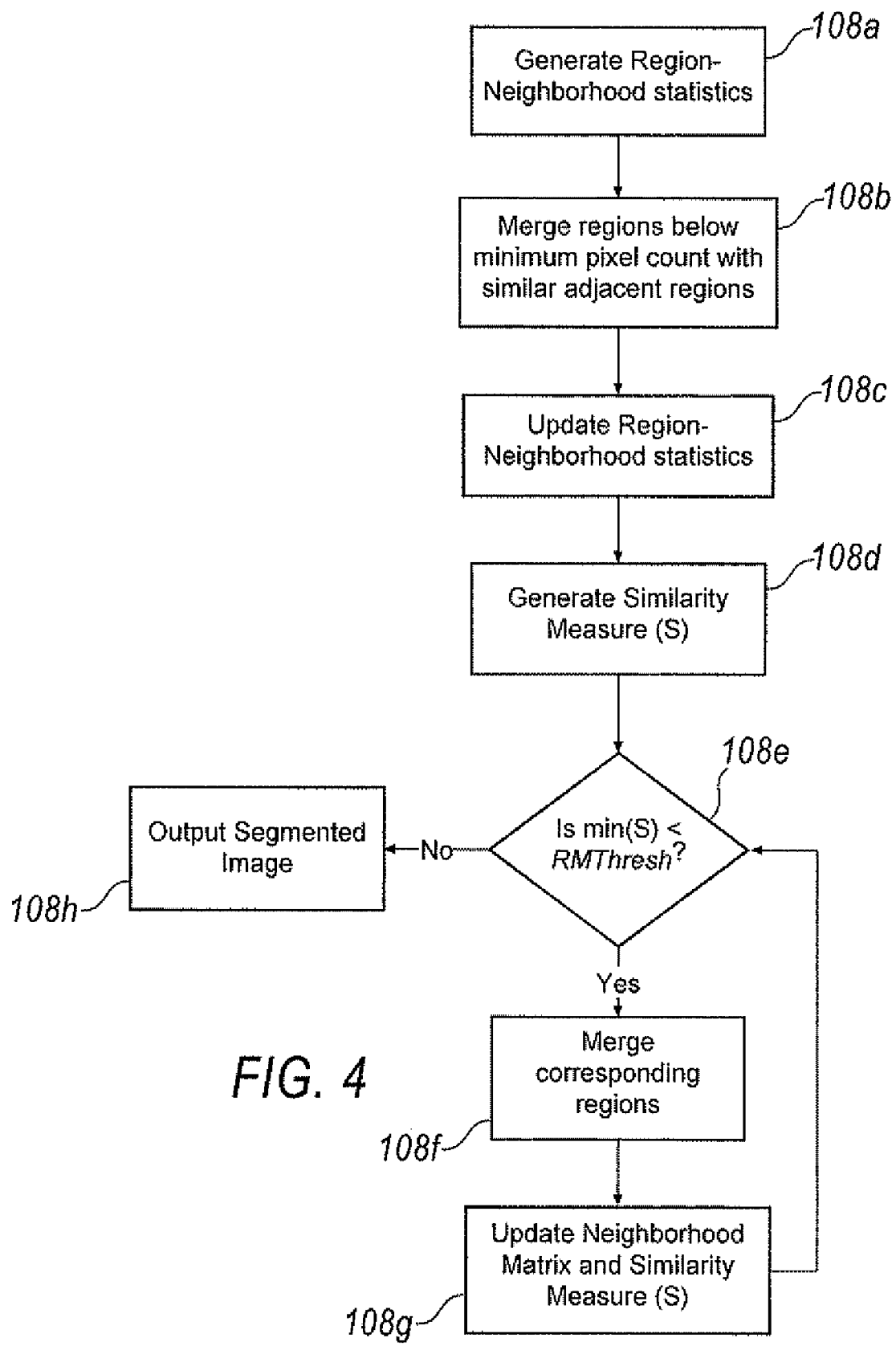
FIG. 4 illustrates an exemplary region merging process, according to an embodiment.

The region growing of step 106 is followed by a stage of region merging at step 108. This is step is applied because region growing was brought about by multiple seeds, some originating from the same region. Consequently, a single region may consist of more than one partition, which is undesirable. This over-segmentation issue is solved by merging these partitions based on some similarity criterion. The flow chart in FIG. 4, illustrates an exemplary region merging process. At step 108 a, starting with the region-grown map obtained from the region-growing stage, mean and covariance measures (region-neighborhood statistics) for each region and its adjacent neighbors are generated. At step 108 b and 108 c, regions that are below a minimum pixel count with their neighbors are merged and new region-neighborhood statistics are updated.

At step 108 d a similarity measure S is computed. Given two regions A and B, the similarity measure between the two regions with color means, $\mu_A$ and $\mu_B$, and color covariances, $cov_A$ and $cov_B$ is defined as $$S_{A,B} = (\mu_A - \mu_B)^T * inv(cov_A + cov_B) * (\mu_A - \mu_B) \tag{16}$$

Because the similarity measure includes both the mean and the covariances of the pixels in the regions to be merged, the regions are compared not just for their color content but also their texture content before a merging decision is made. At step 108 e, the similarity measure is compared to a minimum region merging threshold, RMThresh. Adjacent regions with the least value of S correspond to highly similar regions are merged at step 108f Region-neighborhood statistics and S are updated at step 108 g for the next merging step. This process continues iteratively until the threshold for merging, RMThresh is reached. The result is the final segmented image output at Step 108*h*, and a final segmentation result is achieved at step 110 of FIG. 1. The value of RMThresh decides the extent of merging. Higher values lead to more merging of regions and vice versa.

It is to be understood that the above description is intended to be illustrative and not restrictive. Many embodiments and applications other than the examples provided would be apparent to those skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A method for segmenting an image, comprising:
   computing a color gradient map based on an inputted image;
   selecting at least one initial seed of at least one pixel based on said color gradient map;
   growing a region of pixels adjacent to said initial seed; and
   merging adjacent regions of pixels using a measure of similarity,
   in which computing a color gradient map based on an inputted image comprises:
      generating an enhanced color gradient map in which a contrast between low and high color gradients in said color gradient map are non-linearly increased, and
      generating a weighted color gradient map in which said weighted color gradient map is a function of said enhanced color gradient map and a binary threshold that defines strong edge locations.

2. The method of claim 1, in which selecting at least one initial seed includes determining an optimal threshold.

3. The method of claim 2, wherein said optimal threshold is computed using a maximum of a between-class variance between classes of pixels.

4. The method of claim 3, in which said between-class variance is calculated based on a mean probability of an occurrence of a gray-level.

5. The method of claim 1, wherein selecting said at least one initial seed includes assigning initial seeds to four-neighborhood connected pixels with intensities of less than 0.1 of an optimal threshold.

6. The method of claim 1, in which growing said region of pixels uses a dynamic thresholding algorithm.

7. The method of claim 6, in which growing said region of pixels includes determining a first optimal threshold.

8. The method of claim 7, in which growing said region of pixels further includes determining a second optimal threshold, said second optimal threshold is calculated based on a portion of a said image pixels that are not part of a segmented region.

9. The method of claim 1, in which growing said region of pixels includes comparing adjacent pixels to a dynamic threshold.

10. The method of claim 9, wherein said dynamic threshold increases with each iteration of pixel growing.

11. The method of claim 1, in which growing said region of pixels includes limiting pixel growth by a growth factor.

12. A computer-readable non-transitory medium storing a set of computer executable instructions, the instructions, when executed by a computer, are configure to:
    compute a color gradient map based on an inputted image;
    select at least one initial seed of at least one pixel based on said color gradient map;
    grow a region of pixels adjacent to said initial seed; and
    merge adjacent regions of pixels using a measure of similarity,
    in which the instructions configured to compute a color gradient map based on an inputted image comprises:
       generating an enhanced color gradient map in which a contrast between low and high color gradients in said color gradient map are non-linearly increased, and
       generating a weighted color gradient map in which said weighted color gradient map is a function of said enhanced color gradient map and a binary threshold that defines strong edge locations.

13. The medium of claim 12, in which the instructions configured to grow said region of pixels uses a dynamic thresholding algorithm.

14. The medium of claim 13, in which the instructions configured to grow said region of pixels includes determining a first optimal threshold.

15. The medium of claim 12, in which the instructions configured to grow said region of pixels includes comparing adjacent pixels to a dynamic threshold.

16. The medium of claim 15, wherein said dynamic threshold increases with each iteration of pixel growing.

17. The medium of claim 12, wherein the instructions are automatically implemented.

18. The medium of claim 12, wherein the instructions are implemented without supervision.

19. An image processing system comprising:
    a processor configured to:
       determine a color gradient map based on an inputted image;
       select at least one initial seed of at least one pixel based on said color gradient map;
       grow a region of pixels adjacent to said initial seed; and
       merge adjacent regions of pixels using a measure of similarity,
       in which computing a color gradient map based on an inputted image comprises:
          generating an enhanced color gradient map in which a contrast between low and high color gradients in said color gradient map are non-linearly increased, and
          generating a weighted color gradient map in which said weighted color gradient map is a function of said enhanced color gradient map and a binary threshold that defines strong edge locations.

* * * * *